United States Patent [19]

Nowell

[11] 4,414,598
[45] Nov. 8, 1983

[54] REGULATED POWER SUPPLY

[75] Inventor: John R. Nowell, Phoenix, Ariz.

[73] Assignee: Honeywell Information Systems Inc., Phoenix, Ariz.

[21] Appl. No.: 384,848

[22] Filed: Jun. 4, 1982

[51] Int. Cl.³ .......................... H02H 3/10; H02H 7/10
[52] U.S. Cl. ........................................ 361/18; 361/93; 323/284; 323/285; 363/28
[58] Field of Search .................... 361/18, 31, 86, 87, 361/93, 95, 96, 97; 363/28; 323/277, 282, 284, 285; 340/644

[56] References Cited

U.S. PATENT DOCUMENTS

| | | | |
|---|---|---|---|
| 3,573,597 | 4/1971 | Genuit et al. | 363/28 |
| 3,679,964 | 7/1972 | Nowell | 363/28 X |
| 3,843,907 | 10/1974 | Genuit et al. | 361/87 |
| 4,045,887 | 9/1977 | Nowell | 363/28 |
| 4,323,958 | 4/1982 | Nowell | 363/28 |

*Primary Examiner*—Harry E. Moose, Jr.
*Attorney, Agent, or Firm*—A. A. Sapelli; W. W. Holloway; L. P. Elbinger

[57] ABSTRACT

The present invention relates to a power supply which includes a switching regulator and an over-current detector, having a reference circuit for providing an over-current threshold level. A means is provided by the present invention for adjusting the over-current threshold level without interrupting the system by utilizing a switch to provide an inhibit signal to a fault shut down circuit and for inserting a component into the reference circuit to modify the over-current threshold level to the desired adjustment level.

4 Claims, 2 Drawing Figures

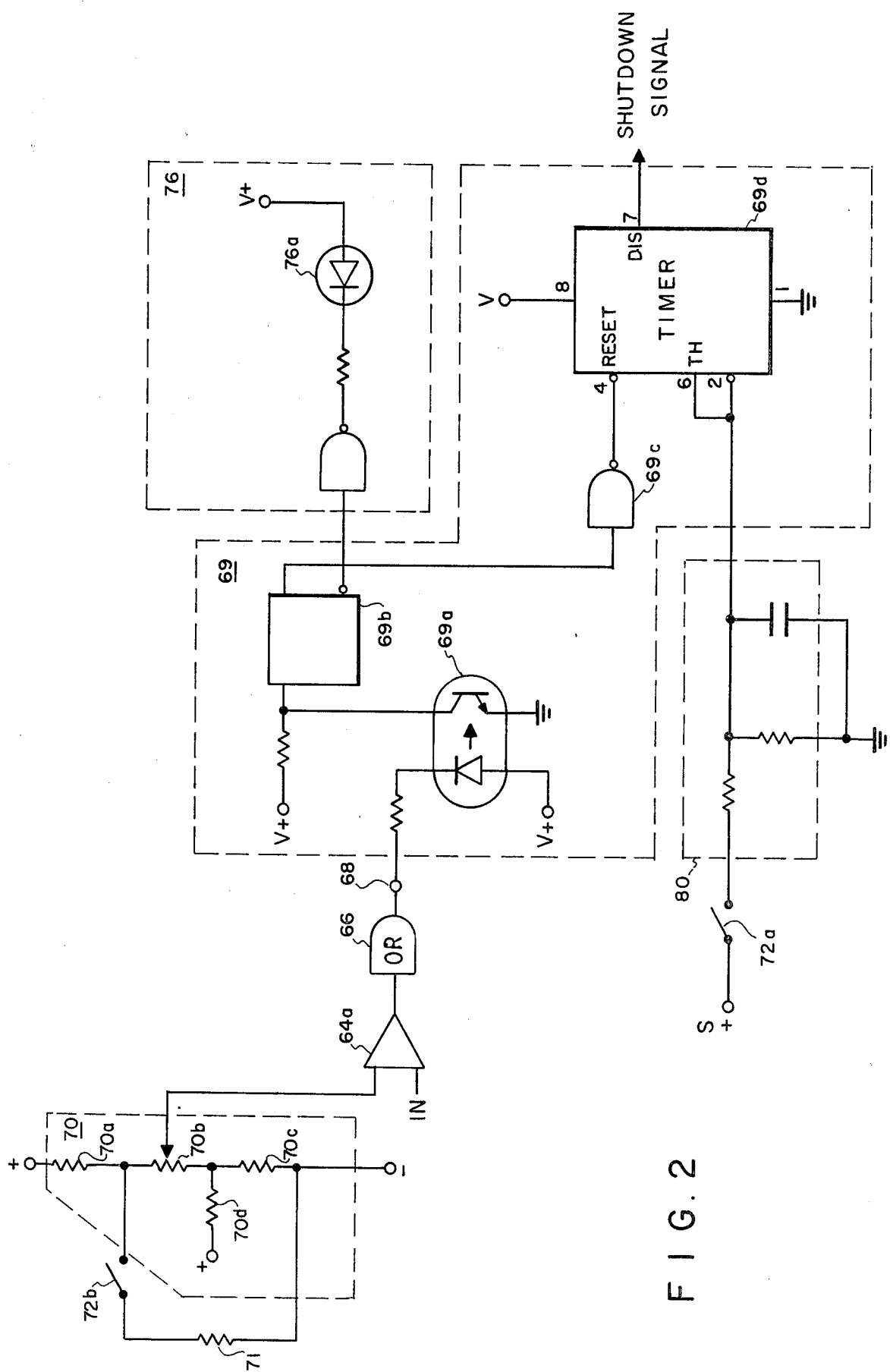
F I G. 2

REGULATED POWER SUPPLY

BACKGROUND OF THE INVENTION

The invention relates to switching regulators and more particularly to over-current detectors which monitor the current delivered by a switching regulator and provide a signal for disabling the regulator when the current exceeds a threshold value.

In high speed data processing systems, microcircuits are used to reduce the physical size of the system and to increase the operating speed. These microcircuits are built in modules each of which may replace a large number of circuits using discrete circuit components. Each of these microcircuit modules requires as much power as several circuits using discrete components so that the power required in a single cabinet of a data processing system using microcircuit modules is several times as large as the power required in a single cabinet using discrete components when the two cabinets have the same physical size. In addition, high speed microcircuits usually use a much smaller value of d.c. voltage than circuits employing discrete components. For example, in many high speed microcircuits the required d.c. voltage may be less than 5 volts. This voltage must be well regulated to provide a constant value of d.c. voltage for the microcircuits otherwise variations in d.c. voltage may produce error signals in the data processing system.

Many of the power supply systems employ switching regulators to provide the low value of well regulated voltage for the data processing systems. The a.c. voltage from a power supply line is converted to a relatively large value of unregulated d.c. voltage at a plurality of locations in the data processing system. This relatively large value of unregulated d.c. voltage can be converted to a relatively small value of d.c. voltage by the switching regulators at various locations in the data processing systems. Each of the switching regulators may employ a transformer, a pair of silicon controlled rectifiers and a source of signal to convert the unregulated d.c. voltage, such as 150 volts, to an accurately regulated voltage, such as 5 volts. The silicon controlled rectifiers are employed as switches between the source of unregulated d.c. voltage and the transformer. The silicon controlled rectifiers are located on the "high" voltage side of the transformer where the current and power losses in these rectifiers are low thereby causing the switching regulator to have a high degree of efficiency. The regulated d.c. voltage obtained from a secondary winding on the transformer is supplied to a pair of voltage output terminals. The transformer provides isolation between the regulated d.c. voltage and the source of unregulated d.c. voltage so that a short circuit in a silicon controlled rectifier will not cause damage to the microcircuit modules which provide the load on the switching regulator.

A signal source is coupled to the voltage output terminals of the switching regulator and develops trigger signals whose frequency is determined by the value of voltage at the voltage output terminal. The trigger signals are coupled to the silicon controlled rectifiers in the switching regulator and cause these rectifiers to deliver energy through the transformers to output filter capacitors which are connected to the voltage output terminal. The signal source senses any change in the value of the trigger signals delivered to the switching regulator. This change in frequency of the trigger signals causes a change in the "duty cycle" of the switching regulator. The duty cycle is a duration of time that energy is delivered to the output filter capacitors compared to the total duration of time between trigger signals. This change in the frequency of the trigger signals and in the duty cycle causes a change in the quantity of energy which the switching regulator delivers to the output filter capacitor so that the voltage at the output terminal returns to the original value.

It is desirable to monitor the current which the switching regulator delivers to a load and to provide a signal which will disable the regulator when the current delivered exceeds a threshold value. It is also desirable that the threshold value of this current be adjustable so that the switching regulator can be used with different loads which may require different values of current. Because previous systems required shutdown of the system to adjust the threshold value of current, adjustments were infrequently made. Therefore, it is still further desirable that the threshold value of current be adjustable without requiring a shutdown or otherwise interrupt the data processing system being supplied.

Accordingly, it is an object of the present invention to provide a power supply which allows for adjusting the over-current detection threshold level without interrupting the system.

This and other objects of the present invention will become more apparent when taken in conjunction with the following description and attached drawings, wherein like characters indicate like parts, and which drawings form a part of the present application.

SUMMARY OF THE INVENTION

Therefore, there is provided by the present invention, a power supply comprising a switching regulator element which outputs a regulated DC voltage over a variable range of DC current. An overcurrent detector element, having a reference circuit, detects when the DC current exceeds a predetermined threshold, the predetermined threshold established by the reference circuit, thereupon outputting an overcurrent signal causing the switching regulator element to be shutdown. A circuit element, and a gate element for operatively connecting the overcurrent detector element to the switching regulator element is included. A switch element manually operatively connects the circuit element to the reference circuit to modify the predetermined threshold, and also manually operatively connects an inhibit signal to the gate element thereby inhibiting the overcurrent signal from being transmitted to the switching regulator element.

BRIEF DESCRIPTION OF THE DRAWINGS

FIG. 2 shows a logic diagram of the preferred embodiment of the AND-gate function of the present invention.

DETAILED DESCRIPTION

Figure 1:
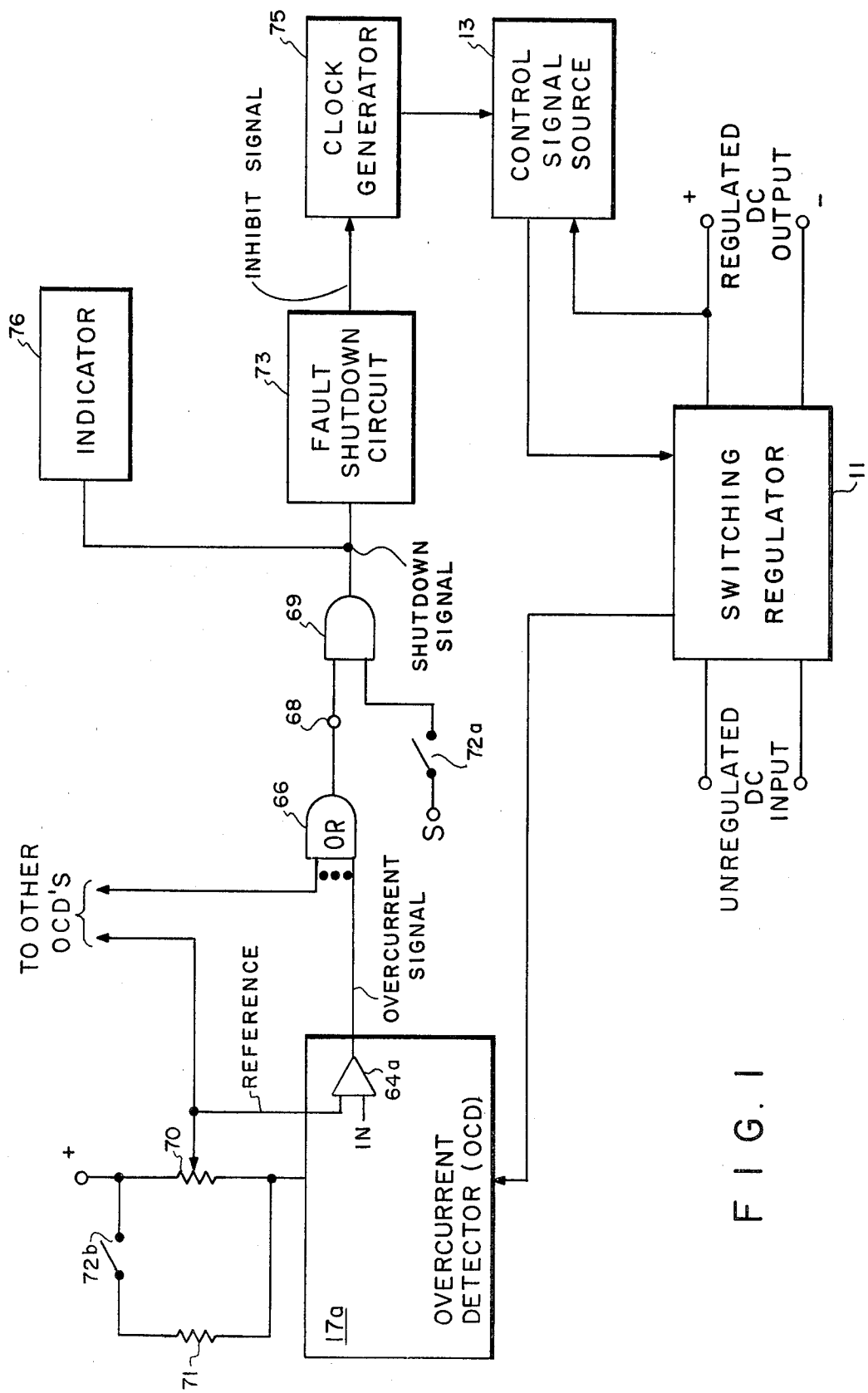
FIG. 1 shows a block diagram of the present invention.

Referring to FIG. 1, there is shown a block diagram of the present invention utilized in a regulated power supply device. FIG. 1 shows a switching regulator 11 having an unregulated DC input and a regulated DC output. A control signal source 13 monitors the regulated DC output and applies a control signal back to the switching regulator 11, thereby regulating the output of the switching regulator 11. An over-current detector 17a also monitors switching regulator 11. Over-current detector 17a includes a comparator 64a which receives as a first input a reference voltage from potentiometer 70, and a second input, IN, which is an input voltage generated by the over-current detector 17a logic (not shown) based upon the monitored voltage received from switching regulator 11. The output of the comparator 64a, an OVER-CURRENT signal, is coupled to an output terminal 68 through an OR-gate 66. The reference voltage provided by potentiometer 70 can be coupled to other over-current detectors (not shown). Likewise the output of the respective comparators of the other over-current detectors (not shown) may be coupled to OR-gate 66. When an over-current condition is detected by over-current detector 17a, an output voltage from comparator 64a would result, i.e., the OVER-CURRENT signal would be present, and would be coupled to the output terminal 68. An AND-gate 69, which is normally enabled, would receive the OVER-CURRENT signal and transmit a SHUTDOWN signal to a fault shutdown circuit 73, which in turn would transmit an INHIBIT signal to a clock generator 75. The clock generator 75 would cause the control signal source 13 to essentially shut down or turn off switching regulator 11. The output of AND-gate 69 can also be coupled to an indicator 76 for providing a visual indication to an operator when an over-current condition is detected.

When it is desired to set the reference voltage provided to the over-current detectors by potentiometer 70, the operator manually depresses switch 72. Two conditions are provided by the manual depression of switch 72. Signal S, or some predetermined level including ground, is coupled to AND-gate 69 which inhibits the OVER-CURRENT signal provided to output terminal 68 from being transmitted to fault shutdown circuit 73. Also a resistor 71 is connected across potentiometer 70, thereby providing a lowered reference voltage. The value of resistor 71 is selected to yield a drop in the reference voltage essentially equal to the same percentage that the reference voltage is normally set over the nominal voltage of the input voltage, IN, to comparator 64a. The operator can then adjust potentiometer 70 such that the indicator 76 is observed to change state. For example, a light which just turns on or just turns off with a slight variation of the potentiometer is at the threshold of the desired potentiometer setting, i.e. the desired reference voltage. At this point the operator releases switch 72 and the reference voltage will then increase to the predetermined percentage above the nominal value of the input voltage IN desired by the designer. AND-gate 69 is also enabled thereby allowing the over-current detector circuit to cause a shutdown of switching regulator 11 upon detecting an over-current condition. During the adjustment of potentiometer 70, regulated DC output from switching regulator 11 was available to the system.

Referring to FIG. 2, there is shown a logic diagram of the preferred embodiment of AND-gate 69 of the present invention. AND-gate 69 comprises an optical coupler 69a operatively connected to the output terminal 68, a latch circuit, e.g., a D-type flip-flop such as integrated circuit part number 74LS75, 69b, inverter 69c, and timer 69d. Timer 69d of the preferred embodiment is a commercially available integrated circuit timer LM555. When the input, RESET, to the timer 69d is low, the output, DIS, is held low. When the input, TH, to the timer 69d is high, output DIS is held low. (When DIS is low, the SHUTDOWN signal is not present). The TH signal is held high with switch 72a depressed, by signal S, through an integrating circuit network 80.

Potentiometer 70 of the preferred embodiment is shown comprising a resistor network 70a–d. Nominal values of the resistors of the preferred embodiment are (in ohms):

| Resistor | 70a | 10K |
|---|---|---|
| Potentiometer | 70b | 10K |
| Resistor | 70c | 249 |
| Resistor | 70d | 78K |
| Resistor | 71 | 82.5K. |

The indicator 76a of the preferred embodiment is a light emitting diode (LED).

Fault shutdown circuit 73a is implemented in the preferred embodiment of the present invention utilizing Motorola integated circuit MC3423, overvoltage "Crowbar" sensing circuit.

Switching regulator 11 is shown in FIG. 1 of U.S. Pat. No. 3,843,907 and fully described therein.

Over-current detector 17a is shown in FIG. 4 of U.S. Pat. No. 3,843,907 and fully described therein.

Control Signal Source 13 can be of the type shown in FIG. 7 of U.S. Pat. No. 3,573,597, of FIG. 4 of U.S. Pat. No. 4,323,958.

Clock Generator 75 can be of the type shown in FIG. 3 of U.S. Pat. No. 4,323,958.

Potentiometer 70, and OR-Gate 66, the output of OR-Gate 66 delivering a voltage to output terminal 68, is also shown in connection with over-current detector 17a in FIG. 4 of U.S. Pat. No. 3,843,907.

All of the above referenced U.S. patents have issued to the inventor of the present application as either a sole or joint inventor, and are incorporated by reference herein.

It will be understood by those skilled in the art that the over-current detetor 17a may include two sections so that a dual switching regulator can be used with such over-current detector. It will further be understood that other sections may be added to the over-current detector 17a so that more sections of the switching regulator 11 may be used with this over-current detector. A single section of the over-current detector without OR-gate 66 may be used to provide over-current protection for a single switching regulator 11.

While there has been shown what is considered to be the preferred embodiment of the invention, it will be manifest that many changes and modifications can be made therein without departing from the essential spirit and scope of the invention. It is intended, therefore, in the annexed claims, to cover all such changes and modifications which fall within the true scope of the invention.

I claim:

1. A power supply, comprising:
   (a) switching regulator means for outputting a regulated DC voltage over a variable range of DC current;
   (b) over-current detector means, having a reference circuit, for detecting when said DC current exceeds a predetermined threshold, said predetermined threshold established by said reference circuit, thereupon outputting an over-current signal causing said switching regulator means to be shut down;
(c) a circuit element;
(d) gate means for operatively connecting said over-current detector means to said switching regulator means; and
(e) switch means for manually operatively connecting:
  (i) said circuit element to said reference circuit to modify said predetermined threshold, and
  (ii) an inhibit signal to said gate means thereby inhibiting said over-current signal from being transmitted to said switching regulator means.

2. A power supply, according to claim 1, further comprising:
  indicator means operatively coupled to said over-current detector means.

3. A power supply comprising:
(a) at least one switching regulator means for outputting a regulated DC voltage over a variable range of DC current;
(b) at least one over-current detector means, for detecting when said range of DC current exceeds a predetermined threshold, thereupon outputting an over-current signal causing said switching regulator means to be shut down;
(c) a reference circuit, operatively connected to each over-current detector means, for providing said predetermined threshold;
(d) a circuit element;
(e) gate means for operatively connecting each of said over-current detector means to each of said switching regulator means; and
(f) switch means for manually operatively connecting:
  (i) said circuit element to said reference circuit to modify said predetermined threshold, and
  (ii) an inhibit signal to said gate means thereby inhibiting said over-current signal from being transmitted to each of said switching regulator means.

4. A power supply, according to claim 3, further comprising:
  at least one indicator means operatively coupled to a corresponding over-current detector means.

* * * * *